(No Model.)

L. S. HEALD.
TEDDER.

No. 386,921. Patented July 31, 1888.

Attest:
Curt A. Cooper
A. E. J. Hansmann

Leander S. Heald,
Inventor:
By Foster & Freeman
Attys.

UNITED STATES PATENT OFFICE.

LEANDER S. HEALD, OF BARRE, MASSACHUSETTS.

TEDDER.

SPECIFICATION forming part of Letters Patent No. 386,921, dated July 31, 1888.

Application filed November 26, 1886. Serial No. 219,979. (No model.)

*To all whom it may concern:*

Be it known that I, LEANDER S. HEALD, a citizen of the United States, and a resident of Barre, in the county of Worcester and State of Massachusetts, have invented certain new and useful Improvements in Tedder-Frames, of which the following is a specification.

My invention relates to that class of hay-tedders in which the tedder-forks are carried by revolving shafts driven from the axles, as set forth in Letters Patent No. 330,112, heretofore granted to me; and my invention consists in certain improvements having for their object to secure a more rigid tedder-frame and increase the efficiency of the machine.

Figure 1:
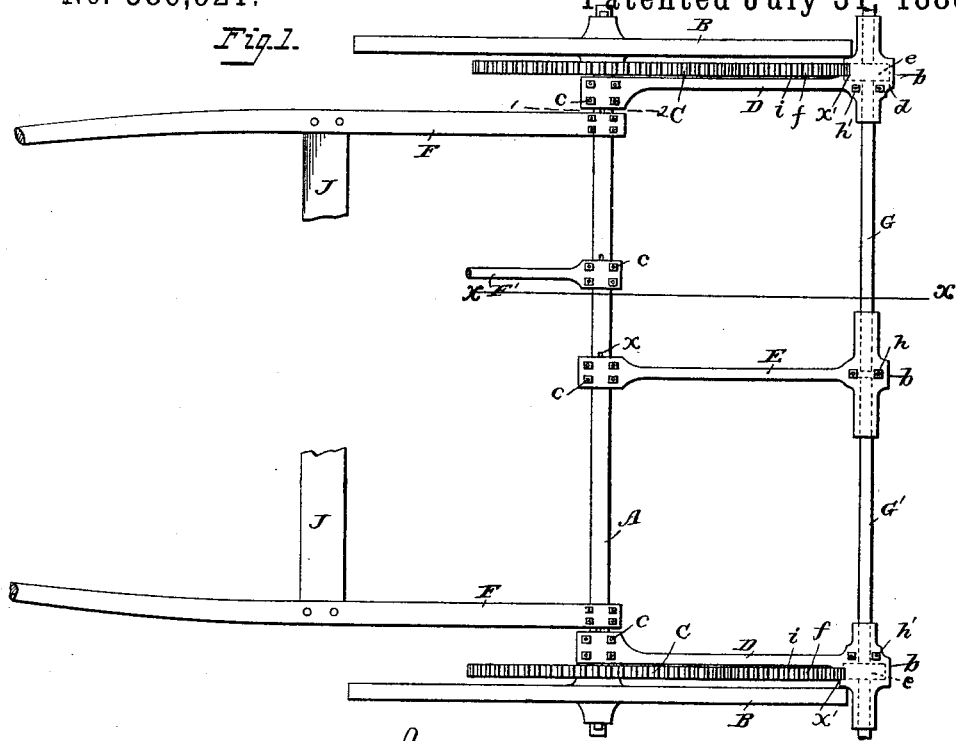
Figure 2:
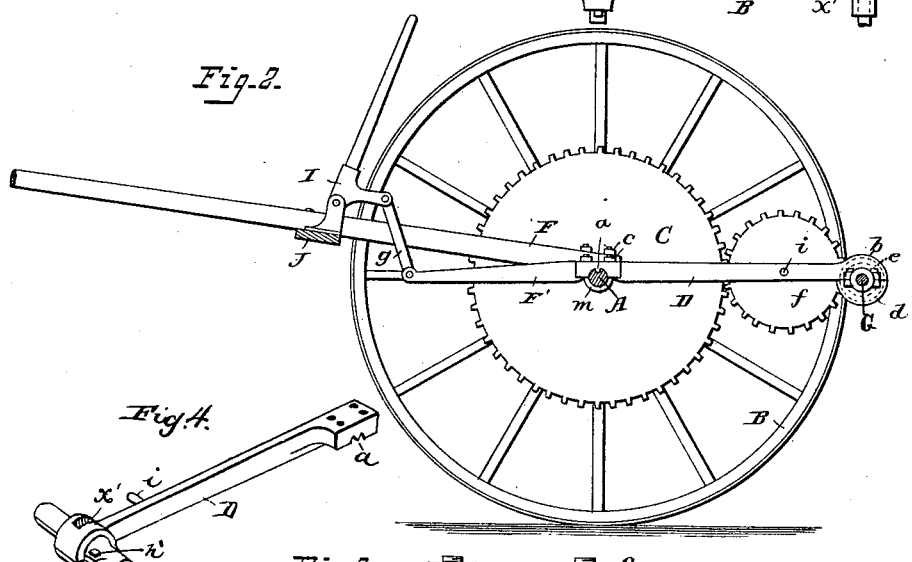
Figure 4:
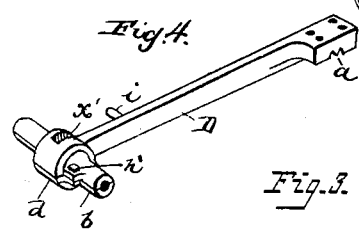
Figure 3:
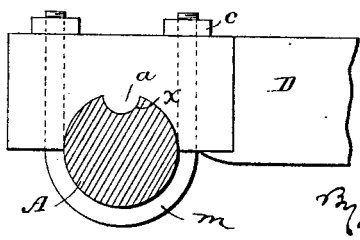

In the drawings, Figure 1 is a plan view of sufficient of a hay-tedder to illustrate my improvements. Fig. 2 is a sectional elevation of the parts shown in Fig. 1, taken on the line 3 4, Fig. 1; Fig. 3, an enlarged section on the line 1 2, Fig. 1, illustrating the connection of the axle and one of the arms; Fig. 4, a detached perspective view of one of the side arms.

In the hay-tedder for which Letters Patent of the United States were granted to me November 10, 1885, No. 330,112, I show a tedder-frame consisting mainly of the axle, side shields, and intermediate arm, the shields and arm having bearings for the tedder-shaft. I have found that the construction shown in said Letters Patent is attended with some disadvantages, which are obviated in the construction which I will now describe.

The axle A is supported by the wheels B B, but does not turn with the latter. A driving gear-wheel, C, turns upon the axle adjacent to each wheel B, which may be connected to or disconnected from the gear by means of a pawl and ratchet, as usual.

In place of the shields described in my aforesaid patent, I secure to the axle, adjacent to each gear-wheel, a side arm, D, and in the center of the axle I secure a third arm, E, the axle and the arms D D E constituting the swinging tedder-frame of the machine, to which is connected the shaft or thill-frame in the ordinary or any suitable manner. As shown, the shaft or thill-frame F is hung at the rear to the axle A. Each arm D E is of cast metal and is recessed to receive the axle H, as shown in Fig 3, and is provided with a lug or feather, *a*, which extends into a groove or seat, *x*, in the axle, so that it is impossible for the axle to turn without carrying with it all the arms. The feather *a* may be formed upon the axle and extend into a groove in the arm, or both the arm and the axle may be grooved for the reception of a key; but I prefer the construction shown, as it avoids forging any projection upon the axle or the use of any detachable key, while the feather *a* upon the arm may be formed in the act of casting the arm.

Each arm D D E is provided at the outer end with a hollow cross-head, *b*, the cross-head of each arm D being enlarged to receive a pinion, *e*, mounted upon the adjacent shaft, G or G', that carries the reels in a manner set forth in my aforesaid patent, and which need not here be described.

The enlarged portion of each cross-head *b* constitutes a shield, *d*, situated outside the longitudinal line of the arm D, and which surrounds and protects the pinion *e*, but which is cut away at the inner side, *x'*, so as to permit the pinion *e* to gear with a gear-wheel, *f*, which transmits motion from the gear C, and which turns upon a stud, *i*, projecting from the side of the arm D. While the shield *d* is cut away to permit the gears to interlock, it overhangs them sufficiently at the meshing-point to prevent the hay from being caught between and clogging the teeth.

The cross-heads *b* may be cast each in one piece with the arm, or they may be divided longitudinally, so that the lower portion will form a cap-piece, which is bolted to the upper portion by means of bolts *h'*, as shown.

The long hollow cross-heads constitute extended bearings for the two sections G G' of the tedder-shaft, so that there will be but little wear upon any one point of the bearings.

The eccentrics referred to in my aforesaid patent, which serve to impart the swinging or feathering action to the forks, may be supported by the ends of the cross-heads.

To the axle A is secured an arm, F', which extends forward and is jointed by a link, *g*, to one arm of an operating-lever, I, pivoted to a standard upon a cross-piece, J, of the shaft-frame, so that by swinging the lever I the axle may be rocked and the reel-shaft raised and lowered with the tedder-frame to vary the position of the reels in respect to the ground.

The arm F' is provided with a projection extending into a groove in the axle like the other arms, and all the arms are clamped to the axle by means of a lower cap-plate, or, preferably, by a strap or yoke, *m*, passing around the under side of the axle and having threaded ends extending through the arm and carrying nuts *c*. By thus connecting the arms rigidly to the axle I am enabled to make a rigid unyielding frame which will support the operating parts fixedly in their positions and without the liability of binding and friction which is apt to result from the use of wooden frames, which twist or warp, or from the use of metal frames in which the parts are so connected as to permit any play or slip.

By constructing each arm D of a single piece, or mainly of a single piece, of cast metal, I maintain the different parts absolutely in their relative positions, and also secure a positive bearing or support for the intermediate gear, *f*, without using the expensive shields set forth in my prior Letters Patent, while the hollow cross head *b* of each arm D constitutes an effectual shield for the pinion, the said shield being formed in the act of making the arm and without the necessity of fitting thereto any separate parts. It will also be seen that as the arms are all made of cast metal the frame is constructed by simply applying the arms to the axle and securing them thereon.

In some instances a polygonal axle may be used, adapted to corresponding openings in the arms, so as to avoid the use of a projection and groove for holding the arms fixedly in position upon the axle.

I do not claim, broadly, a hay-tedder having side arms next the gearing provided with boxes for the tedder-shaft, this being shown in my Letters Patent No. 330,112, in which said arms are formed into hollow shields inclosing the gearing. My present invention is limited to the construction of such arm shown, whereby to reduce the weight and coring necessary, and hence lessen the cost of manufacture, which results I effect by making the side arms in the form already set forth.

Without limiting myself to the precise construction and arrangement of parts shown, I claim—

In a hay-tedder, the combination, with the axle, the wheels, the tedder-shaft, and the side gears for driving the shaft, of side arms, D, supporting said shaft, each side arm consisting of a straight bar rigidly attached at one end to the axle and provided with a side stud, *i*, as a bearing for one of the side gears, and with a divided hollow box or cross-head at the other end, adapted to receive the shaft and the gear thereon, such cross-head being cut away at one side, as at $x'$, to expose the last said gear, substantially as set forth.

In testimony whereof I have signed my name to this specification in the presence of two subscribing witnesses.

LEANDER S. HEALD.

Witnesses:
JAMES N. HEALD,
CHARLES BRIMBLECOM.